United States Patent [19]

Kress et al.

[11] 4,293,252
[45] Oct. 6, 1981

[54] DRILL BIT

[75] Inventors: Dieter Kress, Aalen; Friedrich Häberle, Lauchheim, both of Fed. Rep. of Germany

[73] Assignee: Mapal Fabrik für Prazisionswerkzeuge, Aalen, Fed. Rep. of Germany

[21] Appl. No.: 116,389

[22] Filed: Jan. 29, 1980

[30] Foreign Application Priority Data

Feb. 1, 1979 [DE] Fed. Rep. of Germany ....... 2903814

[51] Int. Cl.³ ............................................ B23B 51/00
[52] U.S. Cl. .................................. 408/224; 408/207; 408/713
[58] Field of Search ............... 408/189, 190, 207, 209, 408/713, 224

[56] References Cited

U.S. PATENT DOCUMENTS

| 3,274,863 | 9/1966 | Faber | 408/207 |
| 3,880,545 | 4/1975 | Kress | 408/224 |
| 4,108,567 | 8/1978 | Faber | 408/224 |
| 4,133,399 | 1/1979 | Herrmann | 408/713 |

FOREIGN PATENT DOCUMENTS 1777420 11/1974 Fed. Rep. of Germany ...... 408/224

Primary Examiner—Harrison L. Hinson
Attorney, Agent, or Firm—Toren, McGeady & Stanger

[57] ABSTRACT

A plurality of cutting plates are mounted in a recess forming a mouth at one end of a drill bit and each cutting plate has a plurality of cutting edges. The drill bit mouth provides chip removal. In the cutting position, the cutting plates are arranged in a plane extending in the direction of the axis of rotation of the drill bit and the cutting edges are arranged in a step-wise manner. The cutting plates can be turned for arranging different ones of the cutting edges in the cutting position. The cutting plates extend radially outwardly from the axis of rotation with one plate adjacent the axis of rotation and the at least one other plate extending radially outwardly from it. The cutting plates have a parallelogram shape in the axial plane of the cutting position. In the cutting position, cutting edges of the cutting plates are in parallel relation to one another with adjacent parallel cutting edges on adjacent cutting plates being in contact with one another. Within the cutting position, the cutting plates are adjustably displaceable in the radial direction. Further, the cutting plates can be secured in the desired position.

7 Claims, 3 Drawing Figures

DRILL BIT

SUMMARY OF THE INVENTION

The present invention is directed to a drill bit or head with a drill bit mouth in one end for chip removal and a plurality of turnable cutting plates defining a part of the drill bit mouth and arranged in a step-wise manner in a plane extending in the axial direction of the drill bit.

In a drill bit of this general type, as disclosed in German Patent No. 1 752 457, two multi-blade cutting plates are individually clamped or chucked to an approximately radially extending wall of the drill bit mouth so that play exists on adjacent cutting edges of the plates which face one another. To absorb the forces acting on the two cutting plates during drilling and to secure the position of the active cutting edges, a special design of the drill bit is required which results in increased production costs. Due to the special design of the drill bit, it is impossible to provide radial adjustability of the cutting plates.

Another known solid drill bit, disclosed in German Auslegeschrift No. 2,522,565, includes an exchangeable, reversible cutting plate screwed to a wall in the drill bit mouth and infinitely adjustable by means of a threaded pin. Such a drill bit has the disadvantage, however, that a relatively high, radially variable cutting pressure acts on the cutting plate whose cutting edge has a length corresponding to the radius of the drill bit. To absorb the cutting pressure an especially expensive or complicated chucking device must be provided. Another disadvantage of this drill bit is that with an increasing diameter of the tool, the cutting plate has increased dimensions which are disadvantageous with respect to the stability of support and to the cost of the bit.

Therefore, it is the primary object of the present invention to afford a drill bit with a main cutting edge formed by a plurality of cutting plates arranged so that the individual cutting plates support one another for securing a stable position of their active or operational cutting edges. Moreover, the combined cutting plates are adjustable in the radial direction of the drill bit by means of an adjusting device acting on the cutting plate located closer to the axis of rotation of the drill bit.

In accordance with the present invention, a plurality of turnable cutting plates are secured in the drill bit mouth with the active cutting edges arranged in a step-wise manner in a plane extending in the axial direction of the drill bit. The cutting plates each have a parallelogram shape with main cutting edges on each of the plates being disposed in parallel relation with one another. Further, adjacent parallel cutting edges on the plates contact one another and the plates rest against a shoulder formed in the drill bit mouth. Guide members mounted in the drill bit afford radial adjustability of the cutting plates.

In the cutting position, one cutting plate is located adjacent the axis of rotation of the drill bit and the at least one other cutting plate extends radially outwardly from it. The one or more radially outer cutting plates have a parallelogram shaped cross section in two sectional planes extending perpendeicularly of one another. The shape of these cutting plates advantageously increases their stable support. Further, the shape of the plates facilitates their use as turnable cutting plates. Moreover, because of the shape of the plates and the undercut shoulder formed in the surface of the drill bit mouth, when cutting pressure is applied the plates will be pressed against the shoulder.

To provide an effective force-locking connection or frictional engagement between a wedge of the adjusting device and the cutting plate closer to the axis of rotation, the cross section of the cutting plate is trapezoidal in two mutually perpendicular planes. This arrangement assures adequate contact between the wedge and the cutting plate. For utilizing the individual cutting edges, the radially outer cutting plates are turned about a diagonal which connects their acute corners, however, the cutting edges of the cutting plate closer to the axis of rotation are placed in the active position by turning the plate about the axis of the bore through which a tightening screw extends.

To take into account the different cutting velocities of the drill bit from the center or axis of rotation ($v=0$) to the radially outer edge ($v_{max}$), it is advantageous if the cutting plates are formed of different qualities of hard or carbide metal. As an example, the radially inner cutting plate would be formed of quality K while the radially outer plate would be formed of quality P each pursuant to the ISO standard.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
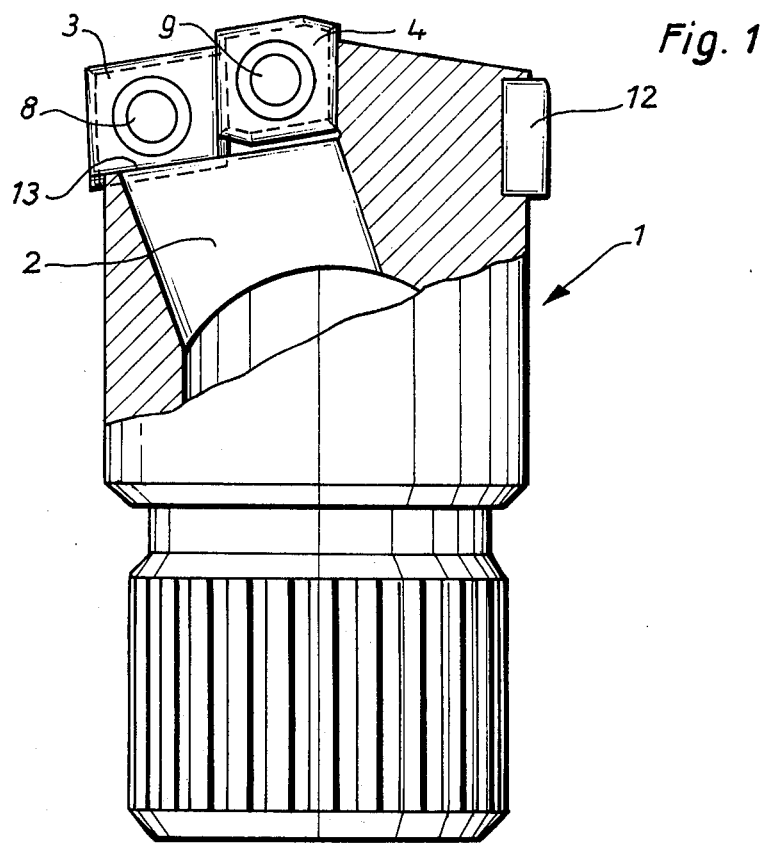
FIG. 1 is an elevational view, partly in section, of a drill bit embodying the present invention.
Figure 2:
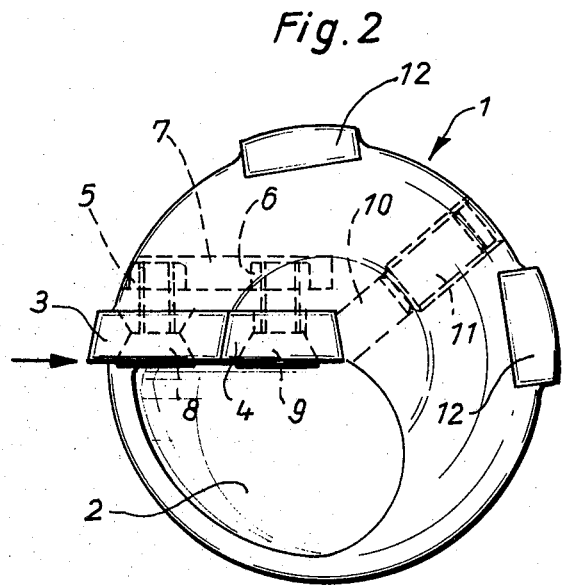
FIG. 2 is a top end view of the drill bit as shown in FIG. 1.

As can be seen in the drawing, particularly in FIG. 2, a drill bit 1 is provided which is tubular in its rearward portion, that is the lower portion as viewed in FIG. 1. The forward or upper portion of the drill bit 1 has a drill bit mouth 2 approximately the size of a quadrant. The drill bit mouth 2 is defined by a recess formed in the forward or upper end of the drill bit 1. Positioned along one side of the mouth are cutting plates 3, 4 each having a bore through it extending perpendicularly of the plane viewed in FIG. 1. The drill bit has an axis of rotation extending therethrough and the cutting plates 3, 4 are positioned in a plane extending in the direction of the axis of rotation with the plates extending radially outwardly from the axis. Cutting plate 4 extends radially outwardly from the axis of rotation while cutting plate 3 extends radially outwardly from cutting plate 4. While two cutting plates are shown it would be possible to use more than two.

As viewed in FIG. 1, the cutting plates 3 and 4 have a parallelogram shape with the cutting edges on each plate being in parallel with cutting edges on the other plate. As can be seen in FIGS. 1 and 2, adjacent parallel cutting edges of the cutting plates 3, 4 are in surface contact with one another. The radially outer cutting plate 3 has a parallelogram-shaped cross section in two sectional planes extending perpendicularly of one another. The radially inner cutting plate 4 has a trapezoidal cross section in two mutually perpendicular planes.

Cutting plates 3, 4 are radially movably mounted in the drill bit mouth with each plate being fixed to a sliding block 5, 6 and with the sliding blocks radially movably mounted in a guide member 7. As mentioned, each of the cutting plates 3, 4 has a central bore extending perpendicularly of the plane of the plates as viewed in FIG. 1. A tightening screw 8, 9 extends through each of the bores into threaded bores in the sliding blocks. Accordingly by tightening the screws 8 and 9 into the sliding blocks the cutting plates can be held in position. Radial adjustment of the cutting plates is effected by means of a wedge 10 located within a bore extending radially through the drill bit 1 and oppositely outwardly from the inner end of the radially inner cutting plate 4. The bore containing the wedge 10 extends obliquely relative to the plane of the faces of the cutting plates as viewed in FIG. 1. A set screw 11 is threaded into the bore containing the wedge 10 and fits against the wedge holding it in contact with the adjacent side face of the cutting plate 4. Due to the trapezoidal shape of the cutting plate 4 and the corresponding wedge surface of the wedge 10 the desired radial adjustment of the cutting plates can be effected by selectively positioning the set screw 11 within the bore.

Figure 3:
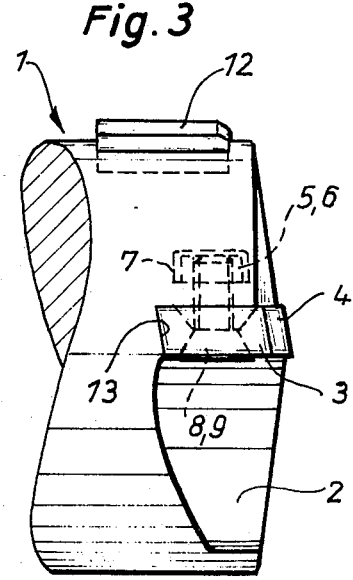
FIG. 3 is a side view of the top and of the drill bit viewed in the direction of the arrow shown in FIG. 2.

The rearward support of the cutting plate spaced in the direction of the axis of rotation inwardly from the forward end of the drill bit is provided by a shoulder 13 formed in the body of the drill bit along one side of the drill bit mouth 2. As can be seen in FIG. 3, the shoulder 13 is undercut in the drill bit body.

As viewed in the drawing, a main cutting edge on each of the cutting plates 3, 4 provides an active cutting edge for the drill bit. The cutting plates can be turned to place new cutting edges in the active position. In addition to the main cutting edges, auxiliary cutting edges are formed on the cutting plates 3, 4 arranged at an angle of approximately 30 min. with the axis of rotation of the drill bit.

As shown in FIG. 2, a pair of guide ledges 12 are located on the circumferential periphery of the drill bit adjacent its forward end.

While specific embodiments of the invention have been shown and described in detail to illustrate the application of the inventive principles, it will be understood that the invention may be embodied otherwise without departing from such principles.

What is claimed is:

1. Drill bit having an axis of rotation with a first end extending transversely of the axis of rotation, said first end having a recess therein forming a drill bit mouth for chip removal, a plurality of turnable cutting plates located in the cutting position in a plane extending generally in the direction of the axis of rotation and also radially outwardly from the axis of rotation, each said cutting plate having a plurality of cutting edges with the active cutting edges arranged in the cutting position being disposed in a step-wise manner in the axial plane of said cutting plates, wherein the improvement comprises that in the axial plane in the cutting position said cutting plates have a parallelogram shape and said cutting edges on said cutting plates include main cutting edges with at least certain of said main cutting edges on one of said cutting plates being in parallel relation with at least certain of said main cutting edges on an adjacent one of said cutting plates, a parallel said main cutting edge on one of said cutting plates being disposed in contact with a corresponding parallel said main cutting edge on the adjacent one of said cutting plates, said recess in said first end of said drill bit having a shoulder formed therein providing a support for said cutting plates, and means for radially adjustably positioning said cutting plates in the cutting position.

2. Drill bit, as set forth in claim 1, wherein said means for radially adjustably positioning said cutting plates comprises guide members formed in said drill bit adjacent said recess, a sliding block having a threaded bore being positioned in said guide member for each said cutting plate, and a screw for each said sliding block with said screw extending through said cutting plate associated with said sliding block and being threaded into the bore in said sliding block.

3. Drill bit, as set forth in claim 2, wherein said cutting plates comprise a first said cutting plate located adjacent to and extending radially outwardly from the axis of rotation of said drill bit and at least one second said cutting plate extending radially outwardly from said first said cutting plate, said means for radially adjustably positioning said cutting plates including a bore in said drill bit extending radially outwardly from the axis of rotation in a direction away from the radial direction of said cutting plates in the cutting position, said bore communicating with the radially inner side of said first cutting plate, a wedge located in said bore in said drill bit and disposed in surface contact with the radially inner side of said first cutting plate for exerting a force for moving said first and second cutting plates in the radial direction, and means positioned in said bore for radially biasing said wedge into contact with said first cutting plate for selectively positioning said wedge relative to said first cutting plate.

4. Drill bit, as set forth in claim 1, wherein said cutting plates comprise a first said cutting plate located in the cutting position adjacent to and extending radially outwardly from the axis of rotation of said drill bit and at least one said second cutting plate extending radially outwardly from said first said cutting plate, said second said cutting plate having a parallelogram shaped cross section in two sectional planes each extending perpendicularly of the other.

5. Drill bit, as set forth in claim 1, wherein said cutting plates each having auxiliary cutting edges formed at an angle of approximately 30 with the axis of rotation of said drill bit.

6. Drill bit, as set forth in claim 1, wherein said cutting plates being formed of different materials based on the different cutting velocities of said cutting plates because of their position radially outwardly from the axis of rotation of said drill bit.

7. Drill bit, as set forth in claim 4, wherein said first cutting plate has a trapezoidal cross section in two cross sectional planes mutually perpendicular to one another.

* * * * *